United States Patent
Lebedev et al.

(10) Patent No.: US 9,792,649 B1
(45) Date of Patent: Oct. 17, 2017

(54) METHODS AND APPARATUS FOR PERFORMING RISK CHECKING

(75) Inventors: Alexei Lebedev, New York, NY (US); Vladimir Parizhsky, New York, NY (US)

(73) Assignee: NYSE ARCA LLC, Chicago, IL (US)

( * ) Notice: Subject to any disclaimer, the term of this patent is extended or adjusted under 35 U.S.C. 154(b) by 1283 days.

(21) Appl. No.: 13/253,732

(22) Filed: Oct. 5, 2011

Related U.S. Application Data

(60) Provisional application No. 61/417,197, filed on Nov. 24, 2010, provisional application No. 61/543,290, filed on Oct. 4, 2011.

(51) Int. Cl.
*G06Q 40/04* (2012.01)
*G06Q 10/06* (2012.01)
*G06Q 10/04* (2012.01)

(52) U.S. Cl.
CPC ............ *G06Q 40/04* (2013.01); *G06Q 10/04* (2013.01); *G06Q 10/0635* (2013.01); *G06Q 10/0639* (2013.01)

(58) Field of Classification Search
CPC .... G06Q 40/04; G06Q 10/0639; G06Q 10/04; G06Q 10/0635
USPC .......................................................... 705/37
See application file for complete search history.

(56) References Cited

U.S. PATENT DOCUMENTS

| | | |
|---|---|---|
| 4,792,947 A | 12/1988 | Takiyasu et al. |
| 5,519,704 A | 5/1996 | Farinacci et al. |
| 5,809,483 A | 9/1998 | Broka et al. |
| 6,430,616 B1 | 8/2002 | Brinnand et al. |
| 6,567,851 B1 | 5/2003 | Kobayashi |
| 6,938,021 B2 | 8/2005 | Shear et al. |

(Continued)

FOREIGN PATENT DOCUMENTS

WO    WO2008020731    2/2008

OTHER PUBLICATIONS

U.S. Appl. No. 13/289,818, Messaging Methods and Apparatus for Use With an Exchange System and/or Client Devices, filed Nov. 4, 2011, pp. 1-67 including cover sheet.

(Continued)

*Primary Examiner* — Kito R Robinson
*Assistant Examiner* — Michael Cranford
(74) *Attorney, Agent, or Firm* — Straub & Straub; Michael P. Straub; Ronald P. Straub

(57) ABSTRACT

Methods and apparatus for implementing an electronic trading system which supports risk checking as part of standard message order processing is described. In accordance with the invention risk checking is moved into the exchange system, e.g., electronic communications network, responsible for servicing transaction/order messages and implementing trades. Thus, at least some level of risk checking is performed on transactions even if a broker allows a trader to submit orders directly to the ECN without first passing through a broker order/risk checking system. Brokers, clients and/or individual traders provide parameters used to perform various checks which are performed within the exchange on submitted orders. Various checks are broker level checks which test that orders placed by individual clients do not exceed constraints which are based on the aggregate of the holdings of the individual clients of a broker. Additional client level and trader specified risk checking may also be performed.

19 Claims, 4 Drawing Sheets

(56) References Cited

U.S. PATENT DOCUMENTS

| | | |
|---|---|---|
| 6,963,914 B1 | 11/2005 | Breitbart et al. |
| 6,965,883 B2 | 11/2005 | Xu et al. |
| 7,035,257 B2 | 4/2006 | Vafaei |
| 7,281,058 B1 | 10/2007 | Shepherd et al. |
| 7,613,160 B2 | 11/2009 | Kitchin |
| 7,685,281 B1 | 3/2010 | Saraiya et al. |
| 7,693,132 B1 | 4/2010 | Cooper et al. |
| 7,885,882 B1 | 2/2011 | Brander et al. |
| 8,060,598 B1 | 11/2011 | Cook et al. |
| 8,391,885 B2 | 3/2013 | Song et al. |
| 8,812,684 B1 | 8/2014 | Hood et al. |
| 2001/0049649 A1 | 12/2001 | Baecker et al. |
| 2002/0069155 A1* | 6/2002 | Nafeh .................... G06Q 40/04 705/37 |
| 2002/0103732 A1 | 8/2002 | Bundy et al. |
| 2002/0103972 A1 | 8/2002 | Satran et al. |
| 2002/0161828 A1 | 10/2002 | Edison et al. |
| 2003/0007490 A1 | 1/2003 | Yi et al. |
| 2003/0050955 A1 | 3/2003 | Eatough et al. |
| 2003/0096605 A1 | 5/2003 | Schlieben et al. |
| 2003/0101283 A1 | 5/2003 | Lewis et al. |
| 2004/0019668 A1 | 1/2004 | Kakadia |
| 2004/0064351 A1 | 4/2004 | Mikurak |
| 2005/0149428 A1 | 7/2005 | Gooch et al. |
| 2005/0283427 A1 | 12/2005 | Owens et al. |
| 2006/0002391 A1 | 1/2006 | Takihiro et al. |
| 2006/0085317 A1 | 4/2006 | Allen |
| 2006/0133376 A1 | 6/2006 | Valdevit |
| 2006/0161625 A1 | 7/2006 | Norp et al. |
| 2006/0193300 A1 | 8/2006 | Rawat et al. |
| 2006/0223498 A1 | 10/2006 | Gallagher et al. |
| 2006/0259560 A1 | 11/2006 | Han et al. |
| 2006/0285527 A1 | 12/2006 | Gao et al. |
| 2006/0285528 A1 | 12/2006 | Gao et al. |
| 2007/0266170 A1 | 11/2007 | Mockett |
| 2008/0062948 A1 | 3/2008 | Ponnuswamy |
| 2008/0117911 A1 | 5/2008 | Rajakarunanayake et al. |
| 2009/0052450 A1 | 2/2009 | Mockett |
| 2009/0067358 A1 | 3/2009 | Fischer |
| 2009/0077567 A1 | 3/2009 | Craddock et al. |
| 2009/0132410 A1 | 5/2009 | Penney et al. |
| 2009/0157797 A1 | 6/2009 | Chang et al. |
| 2009/0164648 A1 | 6/2009 | Xu et al. |
| 2009/0219945 A1 | 9/2009 | Blagojevic et al. |
| 2009/0248886 A1 | 10/2009 | Tan et al. |
| 2009/0281954 A1* | 11/2009 | Waelbroeck ....... G06Q 30/0251 705/80 |
| 2009/0282111 A1 | 11/2009 | Jacobs et al. |
| 2009/0290575 A1 | 11/2009 | Simon |
| 2010/0014519 A1 | 1/2010 | Gutierrez |
| 2010/0017673 A1 | 1/2010 | Lu et al. |
| 2010/0058118 A1 | 3/2010 | Yamaoka |
| 2010/0094743 A1 | 4/2010 | Robertson et al. |
| 2010/0106851 A1 | 4/2010 | Aoki et al. |
| 2010/0115099 A1 | 5/2010 | Gu et al. |
| 2010/0202453 A1 | 8/2010 | Bauza et al. |
| 2010/0220709 A1 | 9/2010 | Peisa |
| 2011/0040669 A1 | 2/2011 | Lee et al. |
| 2011/0126060 A1 | 5/2011 | Grube et al. |
| 2011/0166982 A1* | 7/2011 | Cole .................... G06Q 40/04 705/37 |
| 2011/0178915 A1 | 7/2011 | Vinokour et al. |
| 2011/0252152 A1 | 10/2011 | Sherry et al. |
| 2011/0264578 A1 | 10/2011 | Chapman et al. |
| 2011/0305170 A1 | 12/2011 | Lai et al. |
| 2013/0117426 A1 | 5/2013 | Saraiya et al. |

OTHER PUBLICATIONS

U.S. Appl. No. 13/289,891, Methods and Apparatus for Using Multicast Messaging in a System for Implementing Transactions, filed Nov. 4, 2011, pp. 1-88 including cover sheet.

U.S. Appl. No. 13/289,873, Methods and Apparatus for Detecting Gaps in a Sequence of Messages, Requesting Missing Messages and/or Responding to Requests for Messages, filed Nov. 4, 2011, pp. 1-64 including cover sheet.

U.S. Appl. No. 13/289,777, Methods and Apparatus for Requesting Message Gap Fill Requests and Responding to Message Gap Fill Requests, filed Nov. 4, 2011, pp. 1-82 including cover sheet.

* cited by examiner

US 9,792,649 B1

METHODS AND APPARATUS FOR PERFORMING RISK CHECKING

RELATED APPLICATION

The present application claims the benefit of the filing date of U.S. Provisional Patent Application Ser. No. 61/417,197, filed on Nov. 24, 2010, titled "METHODS AND APPARATUS FOR PERFORMING RISK CHECKING UNDER BROKER CONTROL"; and U.S. Provisional Patent Application Ser. No. 61/543,290, filed on Oct. 4, 2011 and titled "METHODS AND APPARATUS FOR PERFORMING RISK CHECKING", both of which are hereby expressly incorporated by reference in there entirety.

FIELD

The present application relates to trading system methods and apparatus and more particularly, methods and apparatus for performing risk checking operations relating to trade orders prior to proceeding with a trade requested by a trade order.

BACKGROUND

Electronic exchanges, implemented as Electronic Communication Networks (ECNs), are often used as trading systems to electronically trade a wide range of commodities, stocks and/or other items having real world significance. An ECN normally receives messages, e.g., an order from a trader, performs a matching operation, and if a matching order exists, performs a trade. The resulting trade is reported to the traders which placed the matching orders and also to a public system, e.g., for updating published information about the current price of a stock, commodity or other item being traded on the exchange.

Electronic trading on an electronic exchange allows for large numbers of orders to be stored, processed, and executed at relatively low cost. The speed at which a trade can be executed is important to many businessmen trying to obtain a split second advantage over another trader.

A risk with high speed trading is that as part of the rush to place a trade, a trader may improperly enter an order or will not satisfy some other order constraint. Currently, it is generally a broker's responsibility to check that orders placed by the broker's clients for which a broker is responsible comply with trading rules.

To perform risk checking a broker risk checking system normally checks the order placed by a trader against information the broker has about the trader's position, e.g., what shares the trader owns, the trader's margin, etc. For example, a trader may be precluded from selling shares the trader does not own or placing orders exceeding the trader's available credit with the broker.

The information used by a broker to check orders prior to placing them may involve confidential information about the trader's position which is known to the broker but is intentionally kept secret from the electronic exchange for confidentiality reasons, e.g., for fear that the information will be used by other members of the electronic exchange to the trader's disadvantage.

Brokers are often pressured by traders to implement trades as quickly as possible. For large customers, a broker may feel pressured to skip some or all of the normal risk checking process to avoid processing delays associated with risk checking. While skipping of risk checking on orders, sometimes referred to as "naked trading" can speed up the placing of an order, the risk to the exchange of improper or completely incorrect orders can be considerable and, in some cases, may result in one or more trades having to be unwound. This has the potential for creating market instability which is not in the interest of the exchange.

In view of the above discussion, it should be appreciated that it would be desirable if at least some checking of orders was routinely performed prior to execution by an exchange. From the exchange's perspective it would be beneficial if all or some of the risk checking function was performed in such a way that the exchange could be sure that the checking was performed. It would also be desirable that brokers were not given the opportunity to avoid at least some risk checking for some clients, to give them a trading speed advantage, relative to clients of other brokers.

SUMMARY

Methods and apparatus which can be used in implementing message, e.g., order, checking, in an electronic exchange are described. In accordance with various embodiments, at least some risk checking is performed in the electronic exchange before a trade is executed, e.g., made, based on a received transaction message.

In at least some embodiments, a risk checking element, e.g., client gateway with risk checking functionality, in the electronic exchange (e.g., ECN) checks orders prior to performing a matching operation. Broker specified risk checking parameters and/or rules are used in the risk checking performed by the client gateway on transaction messages related to the broker which specified the risk checking parameters. Thus, transaction messages sent by clients and/or traders associated with a broker are checked in the exchange against the applicable broker specified rules and/or parameters. Similarly, client specified risk checking parameters and/or rules are used in the risk checking performed by the client gateway on transaction messages related to the particular client which specified the client specified risk checking parameters. Some or all of the client risk checking parameters and/or rules can apply to all transactions corresponding to the client, e.g., sent by a one or more trader working for the client. Alternatively some or all of the parameters and/or risk checking rules can apply to specific traders operating on behalf of the client. Thus, transaction messages sent by clients and/or traders associated with a client are checked in the exchange against the applicable client specified rules and/or parameters. Similarly trader specified parameters and/or rules can, and in some embodiments are, used by the client gateway in the exchange to check transaction messages corresponding to the trader which provided the trader specified parameters and/or rules.

Thus risk checking is performed under the control of one or more parameters supplied to an exchange from a broker, a client and/or a trader. Transaction messages sent to the exchange normally include an identifier, e.g., a broker-client identifier, which identifies the broker and/or client to which a received transaction message corresponds. The client gateway uses this identifier in various embodiments to identify the broker specified and/or client specified rules and/or parameters to be used for risk checking applied to the received transaction, e.g., order, message. A transaction message may also include a trader identifier, e.g., when one or more traders operate on behalf of a client. The trader identifier in a transaction message is used by the gateway system to determine which trader specified rules are to be used in performing a risk checking operation on a received transaction message.

The risk checking parameters may specify trading limits, e.g., total dollar amounts, total number of shares that may be bought or sold, time periods for which orders may remain valid, etc. Rules may specify how the parameters are to be applied in a risk checking operation. For example a rule may indicate that different trading dollar limits or trading share limits apply to a trader during different portions of a day. Traders may also be limited by rules and/or parameters with regard to the types of securities they can trade and/or they type of trades or transactions they are allowed to make.

In various embodiments in which the risk checking element is incorporated into the ECN, e.g., into a client gateway within the exchange. Trades are allowed to be received and processed from trader systems without first passing through a broker system, e.g., a broker risk checking system.

Risk checking is performed by the client gateway and the transaction message requesting a trade or other transaction is rejected if it fails any of the applied risk checks. The trader is notified of the rejection of a transaction message.

If a client rule or parameter was not satisfied, the client corresponding to the trader is also notified by a message sent from the gateway to a client system. The message informs the client of the transaction message which was rejected, the reason for the rejection and the trader involved. Thus, the client can promptly look into the rejected transaction and improve trader oversight if needed.

Similarly if a broker rule or parameter was not satisfied, the broker corresponding to the rejected transaction message is also notified by a message sent from the gateway to a broker system. The message informs the broker of the transaction message which was rejected, the reason for the rejection and the client and/or trader involved. Thus, the broker can promptly look into the rejected transaction and improve client and/or trader oversight if needed.

Thus, in at least some embodiments, since risk checking is moved into the exchange and the broker system is no longer in the client/trader's path. Accordingly, the ability of a broker to expedite the rate of a trade relative to trades being performed by traders corresponding to other brokers by entirely skipping checking of orders prior to the order being supplied to the electronic exchange is eliminated.

In order to avoid a broker having to disclose positions, e.g., current stock ownership positions, of individual clients, broker level control checks may be performed on orders corresponding to a broker to make sure that orders corresponding to all the broker's clients do not exceed a broker limit, e.g., a total buy sell/limit for a stock in aggregate for all the clients of the broker is not exceeded. For example, if multiple clients own a particular stock and there is a limit applicable to the number of shares which may be sold, the broker level check may reflect the total number of stock shares held by all clients and not a particular individual client. In this way, the broker's clients in total may not exceed a particular trading limit corresponding to the broker without disclosing the position of an individual client.

In some but not necessarily all embodiments, the exchange system performs the same broker level and client level checks on each transaction message which is processed thereby ensuring relatively equal amounts of processing time are used for processing each transaction message. This eliminates timing advantages which may be provided by performing different levels of checking on different orders.

While a broker may authorize some traders to interact directly with the exchange, for small clients or clients likely to have a high number of order errors, the brokers may require trades to be processed by a broker system which performs a higher level of checking than is performed by the exchange system.

Thus, the methods and apparatus of the invention allow for at least some risk checking to be performed by an exchange reducing the risk that a broker will not be able to satisfy trades placed by broker's clients, and without requiring the disclosure of the positions of individual clients of the broker to the exchange. In addition, the methods and apparatus described herein do not preclude a broker from performing a higher level of checking on orders corresponding to some clients in cases where the broker determines such additional checking is desirable or appropriate.

The methods and apparatus described herein are well suited for performing a wide variety of risk management and supervisory procedures. Some aspects of the methods and apparatus may be used to perform one or more of the following:

(i) Prevent the entry of orders that exceed appropriate pre-set credit or capital thresholds in the aggregate for each customer and the broker or dealer and, where appropriate, more finely-tuned by sector, security, or otherwise by rejecting orders if such orders would exceed the applicable credit or capital thresholds; and (ii) Prevent the entry of erroneous orders, by rejecting orders that exceed appropriate price or size parameters, on an order-by-order basis or over a short period of time, or that indicate duplicative orders;

(iii) Prevent the entry of orders unless there has been compliance with all regulatory requirements that must be satisfied on a pre-order entry basis;

(iv) Prevent the entry of orders for securities for a broker or dealer, customer, or other person if such person is restricted from trading those securities;

(v) Restrict access to trading systems and technology that provide market access to persons and accounts pre-approved and authorized by the broker or dealer; and (vi) Assure that appropriate surveillance personnel receive immediate post-trade execution reports that result from market access.

For the above discussion it should be appreciated that numerous variations and embodiments are possible.

DETAILED DESCRIPTION OF THE FIGURES

Figure 1:
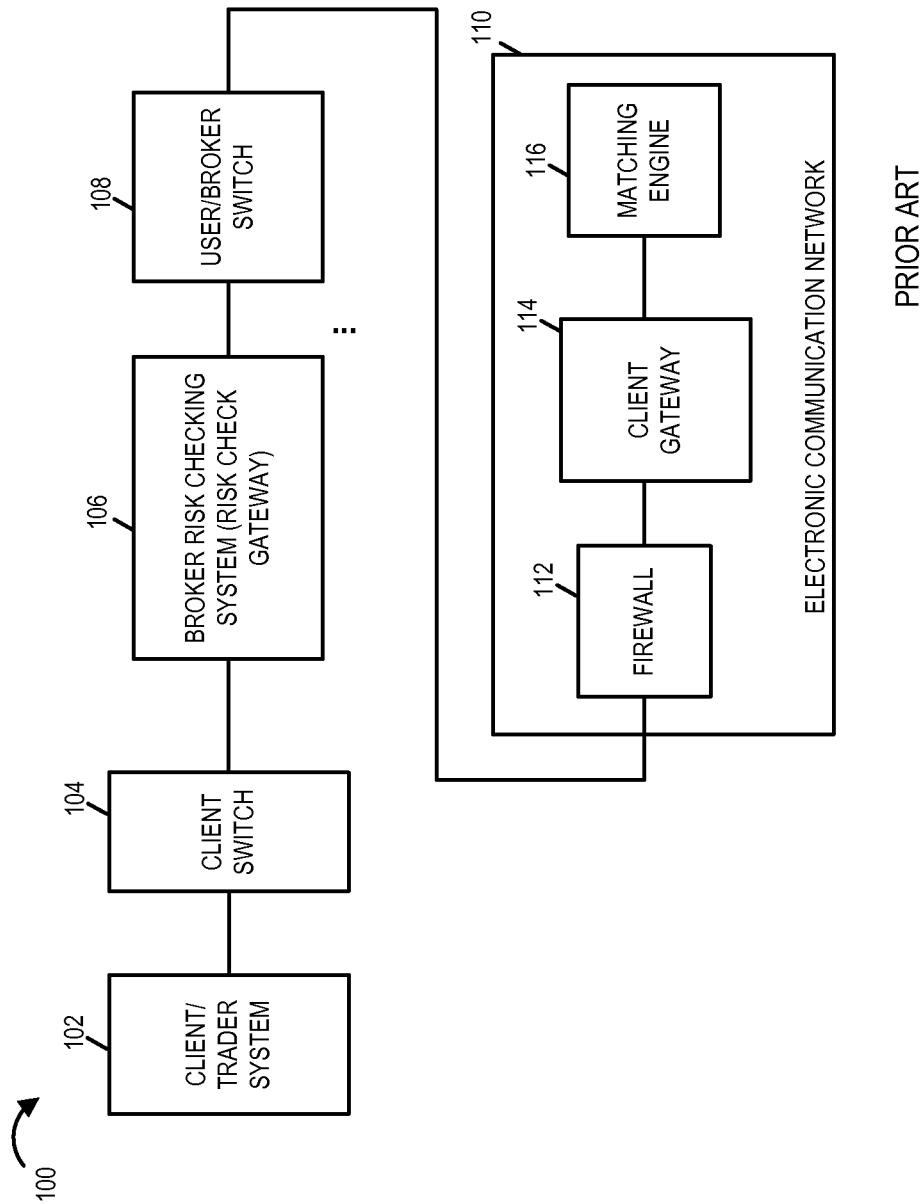
FIG. 1 illustrates a conventional trading system.

FIG. 1 illustrates a known conventional trading system 100. The trading system 100 includes a client/trader system 102, a client switch 104, a broker risk checking system 106, a user/broker switch 108 and an Electronic Communication Network (ECN) 110. The ECN 110 is used as trading system to electronically trade a wide range of commodities, stocks and/or other items having real world significance. The ECN 110 includes a firewall 112, a client gateway 114 and a matching engine 116. The ECN 110 normally receives messages, e.g., an order placed by a client trader using the client/trader system 102. The ECN then performs a matching operation using the matching engine 116 to verify if a matching order exists, and if a matching order exists, performs a trade. The firewall 112 provides security against unauthorized access to the ECN 110. In conventional trading systems, trade orders are routed through the broker and risk checking is performed by the broker risk checking system 106.

Figure 2:
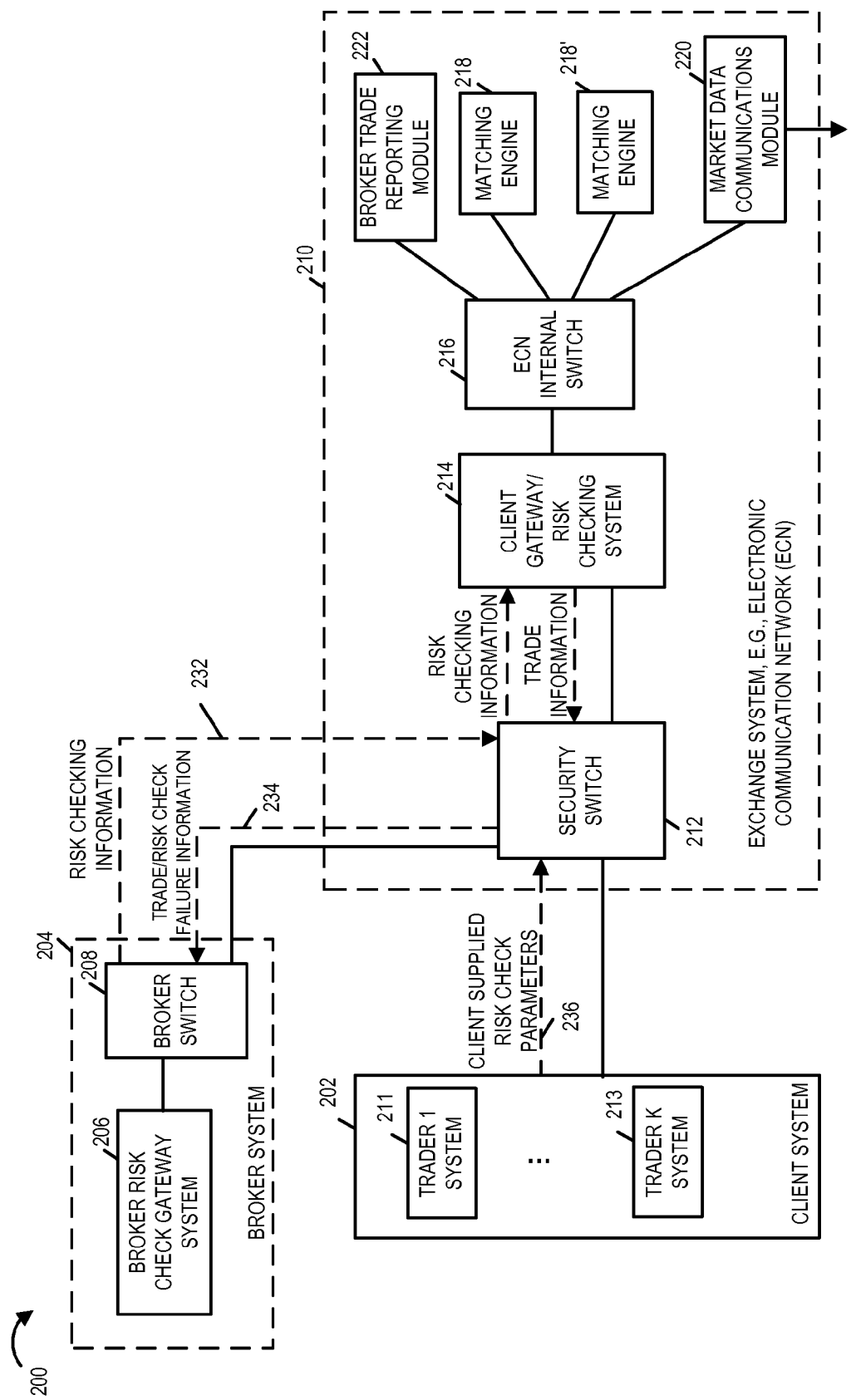
FIG. 2 illustrates an exemplary trading system implemented in accordance with one embodiment of the invention.

FIG. 2 illustrates an exemplary exchange, e.g., trading system 200, implemented in accordance with one embodiment of the invention. The trading system 200 shown in FIG. 2 supports trading, e.g., electronic trading, such as buying/selling of stocks. The exemplary trading system 200 includes a client system 202, a broker system 204, and an Electronic Communication Network (ECN) 210. The ECN 210 includes a security switch 212, a client gateway/risk checking system 214, an ECN internal switch 216, a first matching engine nodule 218 and a second matching engine nodule 218', a market data communications module 220, and a broker trade reporting module 222 coupled together as shown in FIG. 2. The client system 202 includes one or more individual trader systems such as trader 1 system 211 to trader K system 213.

The ECN 210, which is an electronic trading system, may receive messages, e.g., connection establishment message, transaction message for trade orders etc., from a trader system, e.g., such as trader 1 system 211, during normal trading operation, over a communications path. The security switch 212 is coupled to the broker system including a broker risk checking gateway 206 and a broker switch 208, system 204 in addition to being coupled to the client system 202. One or more traders may work and place order on behalf of a client. In such a case, a trader identifier is often included in the transaction message in addition to a broker-client identifier. While a single client system 202 is shown in FIG. 2, it should be appreciated that multiple client systems which perform transactions and interact with the ECN 210 may be present in other embodiments. The security switch 212 securely couples the client system 202 and the broker system 204 to the ECN 210. The transaction messages and other relevant information, e.g., risk checking parameters, are exchanged between the client system 202, broker system 204 and the ECN 210, through the security switch 212.

Electronic trading on an electronic exchange allows for large numbers of orders to be stored, processed, and executed at relatively low cost. The speed at which a trade can be executed is important to many businessmen trying to obtain a split second advantage over another trader. A risk with high speed trading is that as part of the rush to place a trade, a trader may improperly enter an order or will not satisfy some other order constraint. It is generally a broker's responsibility to check that orders placed by the broker's clients, e.g., traders who receive services from the broker's system for trading, e.g., buying/selling stocks, shares etc., for which a broker is responsible comply with trading rules.

In accordance with one aspect, to perform risk checking at the broker's system end, the broker system 204 employs a broker risk checking system 206 that normally checks the order placed by a trader against information the broker has about the trader's position, e.g., what shares the trader owns, the trader's margin, trader's buying/selling limits, etc. For example, a trader may be precluded from selling shares the trader does not own or placing orders exceeding the trader's available credit with the broker. In the embodiment illustrated in the FIG. 2 example, risk checking is implemented in the electronic exchange, e.g., the ECN 210. In accordance with various embodiments, at least some risk checking is performed in the electronic exchange before a trade is executed, e.g., made, based on the received transaction message, e.g., trade transaction message from the trader system 202.

In the illustrated embodiment, a risk checking element, e.g., client gateway/risk checking system 214 with risk checking functionality, in the electronic exchange (e.g., ECN 210) checks orders prior to performing a matching operation. The risk checking is performed under the control of one or more broker supplied parameters, e.g., risk checking information 232, and/or client supplied risk checking parameters. In various embodiments in which the risk checking element is incorporated into the ECN 210, trades are allowed to be received and processed from trader systems, e.g., such as trader system 211, 213 without first passing through a broker system 204, e.g., a broker risk checking system 206. Thus client gateway/risk checking system 214 performs the risk checking operation on the trade orders using the risk checking information, e.g., risk checking parameters, provided by the broker system 204 and the client system 202. Thus in at least some embodiments, since risk checking is moved into the ECN 210 and the broker system 204 is no longer in the trader's path, the ability of a broker to expedite the rate of a trade relative to trades being performed by traders corresponding to other brokers by entirely skipping checking of orders prior to the order being supplied to the electronic exchange is eliminated.

In some embodiments the information exchange, e.g., the risk checking information 232 and trade information 234, between the broker system 204 and the ECN 210 goes through the security switch 212 included in the ECN 210. The ECN internal switch 216 is used for passing processed information between the internal elements of the ECN 210, such as between the risk checking system 214 and matching engines 218, 218', broker trade reporting module 222, and market data communications module 220.

The matching engines 218 and 218' are primary and secondary matching engines respectively. In some embodiments the primary matching engine 218 performs the matching operation on trade orders, after the risk checking operation is completed. The matching engines 218, 218' maintain an order book to keep track of various trades, stocks, shares etc., on the exchange market that are available for trading, check if a match is available corresponding to the trader's trade order. For example, if a received trade order indicates that a trader is looking to buy 100 shares from a certain company X, the matching engines 218, 218' look for shares from company X that are available for buying. If there is a match, the trade order can be performed and the transaction corresponding to the trader requested trade order is completed. Thus, both the primary and secondary (back up) matching engine will receive orders and the secondary matching engine can respond promptly in the event of a failure of the primary matching engine The broker trade reporting module 222 generates one or more reports regarding each transaction, e.g., trade, corresponding to each trade order that is processed at the ECN 210, and communicates the generated report to the broker system 204. In some embodiments a different type of report including trade/transaction data regarding a transaction/trade order requested by the client system 202 or an individual trader may be generated and communicated to the client system 202 and/or to the individual trader system to which the trade/transaction data report corresponds.

The market data communications module 220 disseminates transaction/trade data and/or other transaction information which is to be made publically available. Thus in some embodiments the market data communications module 220 publishes transaction data or trade information which is to be made publically available, e.g., on a website. The published data may be accessed by subscribers, e.g., traders. The published transaction data, in some embodiments, includes updated information about the current price of a stock, commodity or other item being traded on the exchange.

Figure 3:
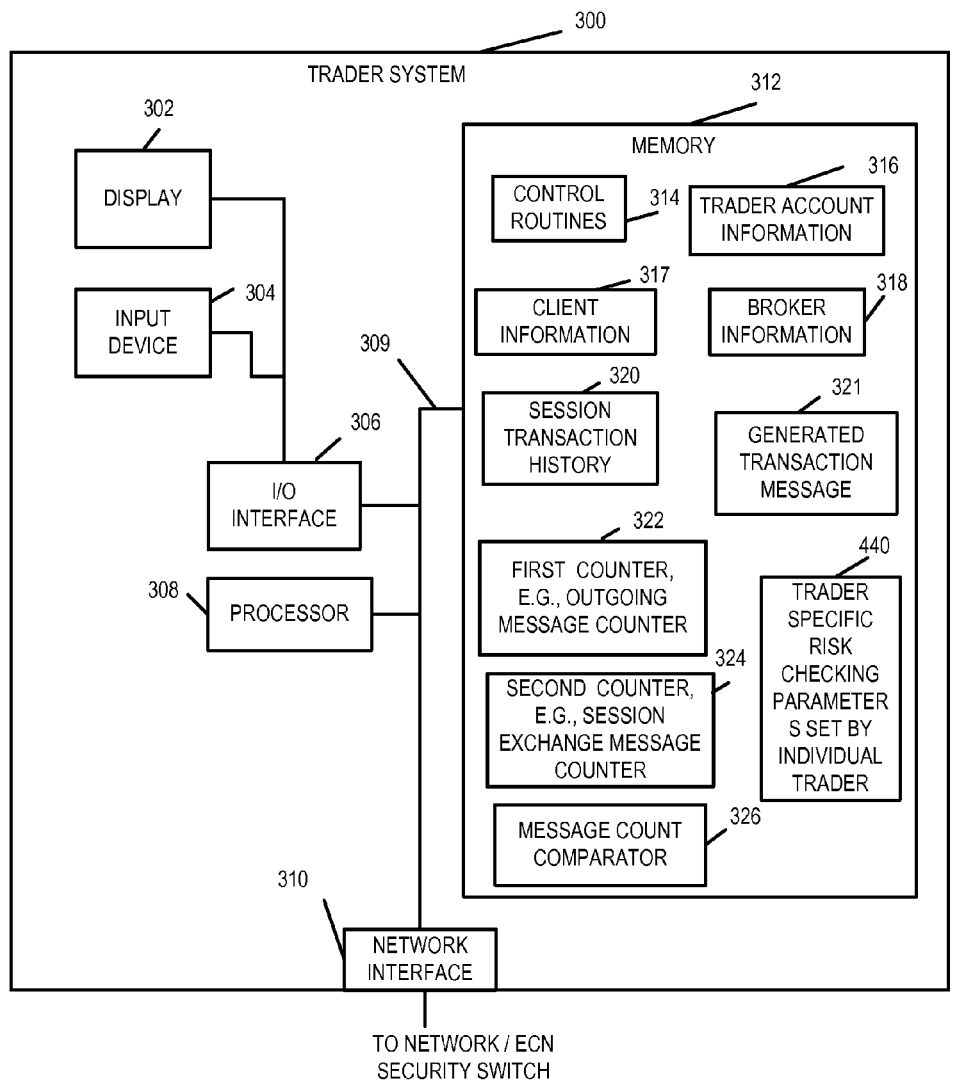
FIG. 3 illustrates an exemplary trader system, in accordance with one exemplary embodiment of the invention.

FIG. 3 illustrates an exemplary trader system 300, in accordance with one exemplary embodiment of the invention. The trader system 300 may be used as any one of the trader systems 211 through 213 shown in FIG. 2. As illustrated, the trader system 300 includes a display 302, an input device 304, processor 308, an I/O interface 306, a network interface 310, and a memory 312 coupled together by a bus 609. The network interface 310 in some embodiments includes a receiver and a transmitter. Via the network interface 310 the trader system 300 can receive and/or send information including, e.g., transaction messages, risk check failure notifications, trade order confirmation reports etc. The network interface 310 includes the receiver which is responsible for receiving and processing information, e.g. trader order confirmation reports. The transmitter module included in the network interface 310 is responsible for generating and sending signals and/or other information. The transmission and reception through the network interface 310 is controlled under the direction of the processor 308 which executes one or more of the routines and/or modules included in memory 312.

The memory 312 includes trader system control routines 314 which control overall trader system operation in accordance with the invention. Control routines 314 may operate in conjunction with various modules which are used to perform various functions. The memory 312 include trader account/identification information 316, client information 317, broker information 318, transaction history 320, generated transaction message 321, a first counter 322, a second counter 324, and a message count comparator 326.

The trader account/identification information 316 in some embodiments includes a trader identifier. A trader identifier identifies the trader and/or trader system to which the transaction, e.g., order, message corresponds. Client information 317 includes information regarding one or more clients with which the trader has a relationship and that the trader system 300 uses for performing trades, e.g., for placing trade orders using the client's system. Broker information 318 includes information regarding one or more broker systems with which the trader has a relationship and that the trader system 300 may use for performing trades, e.g., buying/selling stocks. Broker information includes broker identifiers corresponding to various different brokers systems. A broker identifier is an identifier of a broker which is responsible for backing the trade order placed by the trader system 300, e.g., guaranteeing that the order will be honored and, in some cases, making sure that the trader complies with various trading rules implemented by the applicable government and/or ECN management.

The message number is a unique number that is different for each message sent during a trading session by the trader system 300 from which the transaction message is received. The message number is incremented after each message is sent so that messages from the same trader will bear sequential numbers and lost messages can be readily detected and requested from the trader system and/or a message logging system. The first counter 322 keeps track of the outgoing transaction messages during each trading session. The second counter 324 keeps track of the incoming messages, e.g., transaction acknowledgment/confirmation messages, response messages etc., during each trading session.

The generated transaction message e.g., an order message, is generated in some embodiments by the trader system 300. The transaction message may, and in some embodiments does, include information such as, for example, a trader identifier, a broker identifier (or combined broker-client identifier), a message number in addition to order or other trade information such as a securities identifier, price information, time period for which the order is to remain in effect and/or an indicator indicating the particular type of order, e.g., buy, sell or limit. Depending on the embodiment some of the information may be omitted. The trader identifier identifies the trader and/or trader system to which the transaction, e.g., order, message corresponds. The broker identifier or combined broker-client identifier is an identifier of a broker and/or broker client combination. The identified broker is responsible for backing the order, e.g., guaranteeing that the order will be honored and, in some cases, making sure that the trader complies with various trading rules implemented by the applicable government and/or exchange management. One or more traders may work and place orders on behalf of a client. In such a case, a trader identifier is often included in the transaction message in addition to the broker-client identifier information. The message number is a unique number that is different for each message sent during a trading session by a trader from which the transaction message is received. The message number is incremented after each message is sent so that messages from the same trader will bear sequential numbers and lost messages can be readily detected and requested from the trader system and/or a message logging system. The securities identifier identifies a stock or other item or financial instrument to which the transaction message relates. The message type information indicates the type of message being communicated. The message type may indicate one of a variety of different order types and provide price, quantity and/or duration information relating to the order being communicated. The transaction message may also be an order cancellation type and provide information indicating what previous order that was placed by the trader sending the message is to be canceled.

The transaction messages are sent by a trader and/or broker are received and processed by the client gateway/risk checking system 214 included in the ECN 210, in accordance with one feature of the invention.

Figure 4:
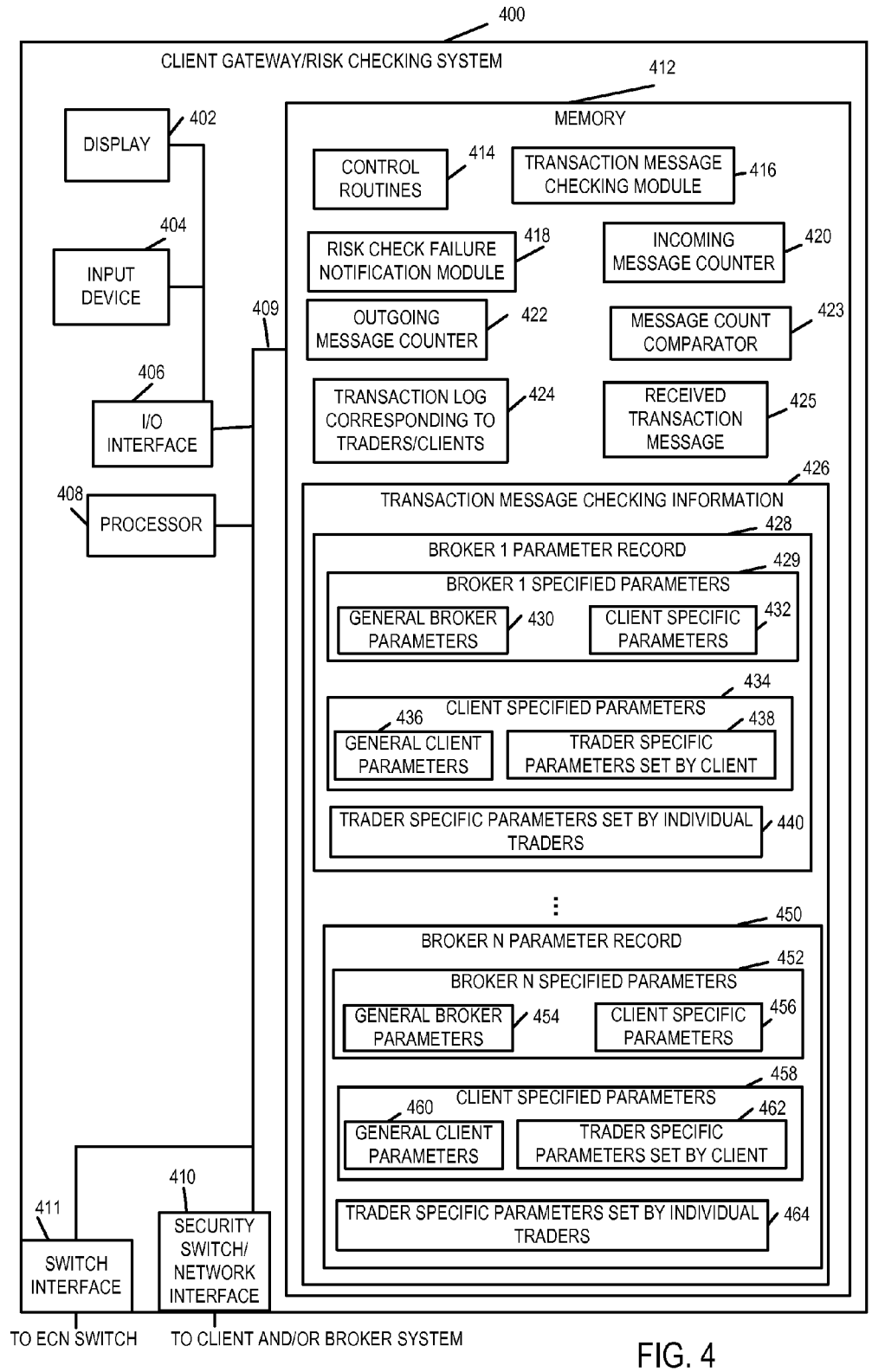
FIG. 4 illustrates an exemplary client gateway/risk checking system, in accordance with one exemplary embodiment of the invention.

FIG. 4 illustrates an exemplary client gateway/risk checking system 400, in accordance with one exemplary embodiment of the invention. The risk checking system 400 can be used as the client gateway/risk checking system 214 in the ECN 210. The risk checking system 400 is responsible for performing risk checking operations performed prior to a trade order transaction completion in accordance with one aspect of the invention.

As illustrated, the risk checking system 400 includes a display 402, an input device 404, processor 408, an I/O interface 406, a security switch/network interface 410, a switch interface 411, and a memory 412 coupled together by a bus 409. The network interface 410 in various embodiments includes a receiver and a transmitter. Via the security switch/network interface 410 the risk checking system 400 can receive and/or send information including, e.g., receive transaction messages, send out risk check failure notifications, etc. The security switch/network interface 410 includes the receiver which is responsible for receiving and processing information, e.g. transaction messages. The transmitter module included in the network interface 410 is responsible for generating and sending signals and/or other information such as, e.g., transaction message receipt confirmation, risk check failure notifications etc. The transmission and reception through the network interface 410 is controlled under the direction of the processor 408 which executes one or more of the routines and/or modules included in memory 412.

The memory 412 includes control routines 414, a transaction message checking module 416, a risk checking failure notification module 418, an incoming message counter 420, an outgoing message counter 422, a message count comparator 423, transaction log corresponding to traders/clients 424, received transaction message 425, and transaction message checking information 426, e.g., parameters corresponding to a plurality of different risk management entities, e.g., brokers, traders etc. The control routines 414 included in the memory 412 control the risk checking system 400 to implement various operations in accordance with the present invention and may use one or more of the other modules in the risk checking apparatus to perform such operations.

In accordance with various embodiments, the gateway/risk checking system 400 receives a transaction message 425, e.g., an order message such as the generated transaction message 321 discussed above, from a trader or broker. Transaction messages sent by a trader and/or broker are received via the security switch/interface 410 and processed by the risk checking system 400. The transaction message 425 includes information and various identifiers that have been discussed above with regard to transaction message 321.

The transaction message checking module 416 for checking a received transaction message for compliance with at least one rule as a function of at least one stored parameter corresponding to a risk management entity, e.g., such as a broker, trader.

The transaction message checking information 426 includes a plurality of different transaction message checking parameters corresponding to different risk management entities. In various embodiments the plurality of different transaction message checking parameters includes a first set of transaction message checking parameters corresponding to a first risk management entity and a second set of risk checking parameters corresponding to a second risk management entity. In some embodiments the first risk management entity is a first broker and said second risk management entity is a client.

As illustrated, the transaction message checking information 426 includes parameter records corresponding to a plurality of brokers, e.g., broker 1 parameter record 428 through broker N parameter record 450. In some embodiments each of the broker parameter record includes at least one of: a set of broker specified parameters, a set of client specified parameters, and a set of trader specific parameters set by individual traders. In the FIG. 4 embodiment broker 1 parameter record 428 includes (i) broker 1 specified parameters 429, e.g., the first set of transaction message checking parameters corresponding to broker 1, (ii) client specified parameters 434, e.g., the second set of transaction message checking parameters corresponding to a client system, and (iii) trader specific parameters set by individual traders, e.g., traders corresponding to broker 1 that are using broker 1 as the guarantor. Thus it should be appreciated that multiple levels of risk checks may be implemented as part of the risk checking operation.

The risk checking system 400 may perform broker level control checks on orders corresponding to a broker to make sure that orders corresponding to all the broker's clients do not exceed a broker limit, e.g., a total buy sell/limit for a stock in aggregate for all the clients of the broker is not exceeded. The broker 1 specified parameters include at least one parameter used for performing risk checking on transaction messages corresponding to multiple clients of said broker 1 (short selling overall constraint relative to broker). Such parameters which apply to all the multiple clients of broker 1 are included in the general broker parameters 430.

For example, if multiple clients own a particular stock and there is a limit applicable to the number of shares which may be sold, the general broker parameters 430 include the applicable limits so that a broker level check performed using the general broker parameters 430 ensures that the broker's clients in total may not exceed a particular trading limit corresponding to the broker 1 without disclosing the position of an individual client.

In addition to broker level constraints, individual client level constraints may be imposed by a broker and checked by the risk checking system 400. Client specific parameters 432 include such client level constraints specified and set by the broker 1. For example, broker 1 may specify a total trading limit in terms of a dollar amount for a plurality of individual clients. Thus the set of risk checking parameters corresponding to individual brokers, e.g., parameter set 429 corresponding to broker 1, . . . , parameter set 452 corresponding to broker N, further include client specific parameters set by the individual brokers, e.g., broker 1, . . . , broker N, to be applied to individual specified clients of said individual brokers (total dollar amount, short selling limit, share limit, etc. Similarly, client specific parameters 456, included in broker N parameter record 450, include client level constraints specified and set by the broker N.

A second set risk checking parameters is, e.g., the client specified parameters such as parameter sets 434, 458 corresponding to broker 1 and broker N respectively. The second set of parameters include at least one of a short selling limit, total dollar trading limit, share number trading limit applicable to one or more traders, specified by a client to which said second set of parameters corresponds. The set of parameters 434 include general client parameters 436 which includes parameters that apply to all the traders corresponding to the client, e.g., certain trading limits applicable to all. The set of parameters 434 further includes trader specific parameters set by a client 438 which includes control parameters/constraints applicable to individual traders corresponding to the client, e.g., credit limits, privileges, restrictions, etc., for various individual traders corresponding to the client. As each individual trader is different and each individual trader's privileges/business relation with the client is different, the control parameters corresponding to each individual trader set by the client may also be different.

Another level of check that is performed using a third set of parameters in some embodiments, in addition to the broker level and client level checks, is the trader specified parameter check. Trader specified parameters set by individual traders, e.g., corresponding to broker 1, . . . , corresponding to broker N, are stored as parameter sets 440, 464. In some embodiments a received transaction message includes a trader identifier identifying the trader requesting the trade/transaction. The risk checking system 400 then performs a check, corresponding to the identified trader, using the parameters included in the trader specific parameters set 440 to ensure that the constraints set by the identified trader are met. For example, an individual trader may impose a maximum trade limit upon itself so that it does not go beyond a certain level of available credit, e.g., does not go beyond 50% of the allowed purchase limit in a given period of time. Various other trader specified criterions are possible.

Thus the third set of parameters, e.g., trader specific parameters set by individual traders, include one or more sets of parameters, each set of parameters in the one or more set of parameters included in the third set being specified by each individual trader to which a given set of parameters corresponds.

Broker N parameter record 450 includes similar parameters sets as discussed with regard to broker 1 parameter record 428.

In various embodiments the transaction checking module 416 is configured to reject a transaction if a risk check applied to a transaction message fails, e.g., if the risk check performed using the transaction message checking parameters 426 fails. In various embodiments the risk check failure notification module 418 is configured to notify a client when a message corresponding to said client fails a risk check. In some embodiments the risk check failure module 418 is further configured to notify a broker when a broker specified risk check fails. In some embodiments the risk check failure module 418 is further configured to notify a trader when a trader specified risk check fails.

The incoming message counter 420 keeps track of the incoming messages, e.g., transaction messages from trader systems, while the outgoing message counter 422 keeps track of the outgoing messages, e.g., transaction confirmation messages, to the broker, client and/or trader system. The message count comparator 423 is configured to compare incoming and outgoing message count and determine if there are one or more messages that may have been missed, e.g., by the trader system 211. In some embodiments the comparator 423 provides information regarding missing/lost transaction messages to the processor 408 so that such missing messages can be provided to a trader system which has lost synchronization with the exchange, e.g., ECN 210.

The techniques of various embodiments may be implemented using software, hardware and/or a combination of software and hardware. Various embodiments are directed to apparatus, e.g., gateways, severs, nodes, terminals, etc. Various embodiments are also directed to methods, e.g., methods of performing risk checking. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, generation and/or transmission steps. Thus, in some embodiments various features are implemented using modules. Such modules may be implemented using software, hardware or a combination of software and hardware. Thus, in at least some embodiments the modules are hardware modules. Many of the above described methods or method steps can be implemented using machine, e.g., computer, executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., gateway or other node, are configured to perform one or more of the steps of the methods described herein. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., node, with a processor which includes a module corresponding to each of the steps of the various described methods performed by the device in which the processor is included. In some but not all embodiments a device, e.g., node, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node. The code may be in the form of machine, e.g., computer, executable instructions stored on a non-transitory computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, control device or other device described in the present application.

While described in the context of a trading system, at least some of the methods and apparatus of various embodiments are applicable to a wide range of systems.

What is claimed is:

1. An electronic communication network, comprising:
   a gateway device;
   a security switch coupled to a switch of a broker system and to a trader system and to said gateway device, said security switch being configured to communicate rules received from said broker system, rules received from said trader system and messages received from said trader system to the gateway device;

said gateway device including:

a first interface for receiving messages sent by a user of the trader system on behalf of a client, from the trader system to the security switch without passing through said broker system;

a storage device including stored message checking rules, said message checking rules including: i) broker specified rules communicated from said switch of the broker system to the security switch and ii) trader specified rules communicated from the trader system to the security switch over a communications path which does not traverse the broker system;

a processor configured to check a message, sent by a user of the trader system over the communications path which does not traverse the broker system, for compliance with broker specified rules and trader specified rules and to reject the message if it fails a check; and an electronic communications network switch interface;

a matching engine; and an internal electronic communications network switch coupled to said electronic communications network switch interface of said gateway device and to the matching engine for passing messages which are not rejected by said gateway device to the matching engine for processing.

2. The electronic communication network of claim 1, wherein said storage device includes a plurality of different message checking parameters provided by different entities, and wherein said message checking rules specify how at least some of said message checking parameters are to be applied in message checking operations.

3. The electronic communication network of claim 2, wherein said plurality of different message checking parameters includes a first set of message checking parameters specified by a client, a second set of message checking parameters specified by an entity which provides services to said user, and a third set of message checking parameters specified by said user.

4. The electronic communication network of claim 3, wherein said entity which provides services to said user is a broker; and wherein said messages sent from the user of the trader system on behalf of the client do not pass through the broker system prior to reaching said first interface.

5. The electronic communication network of claim 4, wherein said second set of message checking parameters includes at least one parameter used for performing risk checking on messages corresponding to multiple clients of said broker.

6. The electronic communication network of claim 4, wherein said user is a first trader; and wherein said second set of parameters includes trader specific parameters set by the broker to be applied to messages sent by the first trader.

7. The electronic communication network of claim 6, wherein said second set of parameters include client level constraint information specified by the broker which is to be applied to messages corresponding to an individual client specified by the broker, said client level constraint information including at least one of a short selling limit, total dollar trading limit, or a share number trading limit.

8. The electronic communication network of claim 7, wherein the third set of parameters includes a parameter setting a self imposed trading limit based on a level of credit available to the trader setting the self imposed trading limit.

9. The electronic communication network of claim 7, wherein said processor of said gateway device is configured to reject a message if a message check applied to a message fails.

10. The electronic communication network of claim 9, further comprising:

an interface configured to send a message check failure notification to multiple entities to notify the multiple entities when a message fails a message check, said multiple entities including at least the user from which the message which failed the check was received and another entity, said another entity being a client on who's behalf the message was sent or a broker which provides services to the user from whom the message which failed the check was received.

11. The electronic communication network of claim 1, wherein said storage device further stores a plurality of different message checking parameters, at least one of said message checking parameters being a limit associated with an aggregate limit corresponding to an entity which provides services to said user; and wherein said message checking rules specify how said message checking parameters are to be applied in message checking operations.

12. The electronic communication network of claim 11, wherein said plurality of different message checking parameters includes a first set of message checking parameters provided by the client, a second set of message checking parameters provided by the entity which provides services to said user, and a third set of message checking parameters provided by said user; and wherein the gateway device is configured to reject messages from the trader system which fail a message check and to pass to said matching engine order messages from said trader system which pass message checks.

13. A trading method, comprising:

operating a security switch to communicate rules received from a broker system, rules received from a trader system and messages received from said trader system to a gateway device, said security switch being coupled to a switch of the broker system, to the trader system and to said gateway device;

receiving, via a first interface of said gateway device, messages sent by a user of the trader system on behalf of a client, from the trader system to the security switch without passing through said broker system;

storing message checking rules in a storage device, said message checking rules including: i) broker specified rules communicated from said switch of the broker system to the security switch and ii) trader specified rules communicated from the trader system to the security switch over a communications path which does not traverse the broker system;

checking a message, sent by a user of the trader system over the communications path which does not traverse the broker system, for compliance with broker specified rules and trader specified rules and to reject the message if it fails a check; and passing messages which are not rejected by said gateway device, from an internal electronic communications network switch, to a matching engine for processing, said internal electronic communications network switch being coupled to an electronic communications network switch interface of said gateway device and to said matching engine.

14. The method of claim 13, wherein said step of storing message checking rules in a storage device includes storing a plurality of different message checking parameters; and
wherein said one or more message checking rules specify how at least some of said message checking parameters are to be applied in a message checking operation.

15. The method of claim 14, wherein said plurality of different message checking parameters includes a first set of message checking parameters provided by a client, and a second set of message checking parameters provided by an entity which provides services to said user, and a third set of message checking parameters provided by said user.

16. The method of claim 15, further comprising:
rejecting a message received from a trader if a message check applied to the message received from the trader fails the message check.

17. The method of claim 16, further comprising:
notifying the trader and the client when the message received from the trader fails a rule specified by the client during said message check.

18. The method of claim 17, further comprising:
notifying the trader and the broker when the message received from the trader fails a rule specified by the broker during said message check.

19. A non-transitory computer readable medium, comprising computer executable instructions for controlling a computer to perform the steps of:

controlling a security switch to communicate rules received from a broker system, rules received from a trader system and messages received from said trader system to a gateway device, said security switch being coupled to a switch of the broker system, to the trader system and to said gateway device;

receiving messages sent by a user of the trader system on behalf of a client, from the trader system to the security switch without passing through said broker system;

storing message checking rules in a storage device, said message checking rules including: i) broker specified rules communicated from said switch of the broker system to the security switch and ii) trader specified rules communicated from the trader system to the security switch over a communications path which does not traverse the broker system;

checking a message, sent by a user of the trader system over the communications path which does not traverse the broker system, for compliance with broker specified rules and trader specified rules and to reject the message if it fails a check; and controlling an internal electronic communications network switch coupled to an electronic communications network switch interface of said gateway device and to the matching engine, to pass messages which are not rejected by said gateway device to the matching engine for processing.

\* \* \* \* \*